US012750456B2

(12) United States Patent
Zhang

(10) Patent No.: US 12,750,456 B2
(45) Date of Patent: Sep. 29, 2026

(54) VIDEO GENERATION BASED ON AUTOMATICALLY APPLYING TARGET EFFECT RESOURCES TO TARGET OBJECTS

(71) Applicant: Beijing Zitiao Network Technology Co., Ltd., Beijing (CN)

(72) Inventor: Shupeng Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/691,415

(22) PCT Filed: Sep. 21, 2022

(86) PCT No.: PCT/CN2022/120047

§ 371 (c)(1),
(2) Date: Mar. 12, 2024

(87) PCT Pub. No.: WO2023/065934

PCT Pub. Date: Apr. 27, 2023

(65) Prior Publication Data

US 2024/0406339 A1 Dec. 5, 2024

(30) Foreign Application Priority Data

Oct. 22, 2021 (CN) ......................... 202111234267.3

(51) Int. Cl.
*H04N 5/262* (2006.01)
*G06T 7/70* (2017.01)
(Continued)

(52) U.S. Cl.
CPC ............. *H04N 5/2621* (2013.01); *G06T 7/70* (2017.01); *G06V 10/44* (2022.01); *H04N 23/61* (2023.01)

(58) Field of Classification Search
CPC ................. H04N 5/2621; H04N 23/61; H04N 21/23418; H04N 21/8153; H04N 23/80;
(Continued)

(56) References Cited

U.S. PATENT DOCUMENTS 10,497,180 B1 * 12/2019 Perfilev ................. H04L 67/131
10,818,093 B2 * 10/2020 Chen ......................... G06T 7/70
(Continued)

FOREIGN PATENT DOCUMENTS

CN 104134229 A 11/2014
CN 105491365 A 4/2016
(Continued)

OTHER PUBLICATIONS

International Patent Application No. PCT/CN2022/120047; Int'l Search Report; dated Nov. 28, 2022; 2 pages.
(Continued)

*Primary Examiner* — Usman A Khan
(74) *Attorney, Agent, or Firm* — BakerHostetler

(57) ABSTRACT

The present disclosure provides a method and apparatus, and a device and a storage medium for generating videos. The method comprises acquiring a target image to be identified based on a photographed picture in response to receiving an identification operation triggered for the photographed picture on a photographing page; sending the target image to a server, wherein the server is configured to identify a target object from the target image and determine a target effect resource for the target object; receiving the target effect resource from the server, and applying the target effect resource to the target object in the photographed picture, and generating a target video based on the photographed picture corresponding to the target object to which the target effect resource is applied.

20 Claims, 4 Drawing Sheets

(51) Int. Cl.
*G06V 10/44* (2022.01)
*H04N 23/61* (2023.01)

(58) Field of Classification Search
CPC ........ H04N 5/262; H04N 5/2625; G06T 7/70; G06T 15/205; G06V 10/44; G11B 27/031
USPC .......................................................... 348/239
See application file for complete search history.

(56) References Cited

U.S. PATENT DOCUMENTS

| | | | | |
|---|---|---|---|---|
| 11,012,740 | B2 * | 5/2021 | Wang | H04N 21/4788 |
| 11,297,223 | B2 * | 4/2022 | Rakshit | H04N 23/56 |
| 11,917,301 | B2 * | 2/2024 | Yoshida | H04N 23/611 |
| 2011/0126255 | A1 * | 5/2011 | Perlman | H04N 19/14 725/116 |
| 2015/0208001 | A1 * | 7/2015 | Kaneko | H04N 23/62 348/239 |
| 2019/0199957 | A1 * | 6/2019 | Takahashi | H04N 21/4316 |
| 2020/0404173 | A1 | 12/2020 | Li et al. | |
| 2021/0118235 | A1 | 4/2021 | Hou et al. | |
| 2022/0292543 | A1 * | 9/2022 | Henderson | G06Q 30/0252 |
| 2022/0366219 | A1 * | 11/2022 | Donsbach | H04N 23/632 |
| 2024/0087309 | A1 | 3/2024 | Qiu et al. | |

FOREIGN PATENT DOCUMENTS

| | | | |
|---|---|---|---|
| CN | 107895397 | A | 4/2018 |
| CN | 109688346 | A | 4/2019 |
| CN | 110047115 | A | 7/2019 |
| CN | 110324706 | A | 10/2019 |
| CN | 112287790 | A | 1/2021 |
| CN | 112818737 | A | 5/2021 |
| CN | 113242451 | A | 8/2021 |
| CN | 113470190 | A | 10/2021 |
| CN | 113473017 | A | 10/2021 |
| CN | 113473019 | A | 10/2021 |
| CN | 113505700 | A | 10/2021 |
| CN | 113992851 | A | 1/2022 |
| JP | 2019-501550 | A | 1/2019 |
| JP | 2019161474 | A | 9/2019 |
| JP | 2019197112 | A | 11/2019 |
| JP | 2024519894 | A | 5/2024 |

OTHER PUBLICATIONS

Communication pursuant to Rules 70(2) and 70a(2) EPC for European Application No. 22882545.1, mailed Jan. 7, 2025, 1 page.

Extended European Search Report for European Application No. 22882545.1, mailed Dec. 9, 2024, 11 Pages.

India Patent Application No. 202427027651; Office Action; dated Oct. 28, 2025; 7 pages.

Notice of reasons for refusal for Japanese Application No. 2024-521252, mailed May 13, 2025, 8 pages.

* cited by examiner

VIDEO GENERATION BASED ON AUTOMATICALLY APPLYING TARGET EFFECT RESOURCES TO TARGET OBJECTS

CROSS-REFERENCE TO RELATED APPLICATIONS

The present disclosure is the U.S. National Stage of International Application No. PCT/CN2022/120047, filed on Sep. 21, 2022, which claims priority to Chinese Patent No. 202111234267.3, filed on Oct. 22, 2021, entitled “VIDEO GENERATION METHOD, APPARATUS, DEVICE AND STORAGE MEDIUM”, the disclosures of which are incorporated herein by reference in their entireties.

FIELD

The present disclosure relates to the field of data processing, and more specifically, to a video generation method, apparatus, device and storage medium.

BACKGROUND

With the phenomenal growth of multimedia short videos, people are increasingly interested in taking images and shooting videos and the functions of the photographing page are also more diversified. In such case, the technical problem to be solved at present is how to enrich the functions of video shooting to enhance people's experience in video creation.

SUMMARY

To fully or at least partly address the above technical problem, the embodiments of the present disclosure provides a video generation method that can automatically apply a corresponding target effect resource to a target object on the photographed picture. As such, the functions of video shooting are enriched, so as to enhance the users' experience in video creation.

In a first aspect, the present disclosure provides a video generation method, wherein the method is applied to a client computing device and comprises:

upon receiving an identification operation triggered for a photographed picture on a photographing page, obtaining a target identification image based on the photographed picture on the photographing page;

transmitting the target identification image to a server computing device; wherein the server computing device is used for determining a target effect resource for a target object after identifying the target object from the target identification image;

receiving the target effect resource from the server computing device and applying the target effect resource to the target object on the photographed picture;

generating a target video based on the photographed picture corresponding to the target object to which the target effect resource is applied.

In a second aspect, the present disclosure provides a video generation method, wherein the method is applied to a server computing device and comprises:

receiving a target identification image from a client computing device; wherein the target identification image is obtained based on the photographed picture on the photographing page of the client computing device;

determining whether the target identification image contains any one preset object;

in response to determining that the target identification image contains any one preset object, determining the preset object as target object and determining a target effect resource corresponding to the target object;

returning the target effect resource to the client computing device; wherein the target effect resource is used for generating a target video at the client computing device.

In a third aspect, the present disclosure provides a video generation system, wherein the system includes a client computing device and a server computing device;

the client computing device is used for upon receiving an identification operation triggered for the photographed picture on a photographing page, obtaining a target identification image based on the photographed picture on the photographing page, and transmitting the target identification image to a server computing device;

the server computing device is used for receiving a target identification image from a client computing device and determining whether the target identification image contains any one preset object; determining the preset object as a target object and determining a target effect resource corresponding to the target object in response to determining that the target identification image contains any one preset object; and returning the target effect resource to the client computing device;

the client computing device is further used for receiving the target effect resource from the server computing device and applying the target effect resource to the target object on the photographed picture; and generating a target video based on the photographed picture corresponding to the target object to which the target effect resource is applied.

In a fourth aspect, the present disclosure provides a video generation apparatus, wherein the apparatus is applied to client computing device and comprises:

an acquisition module for upon receiving an identification operation triggered for a photographed picture on a photographing page, obtaining a target identification image based on the photographed picture on the photographing page;

a transmission module for transmitting the target identification image to a server computing device; wherein the server computing device is used for determining a target effect resource for a target object after identifying the target object from the target identification image;

an application module for receiving the target effect resource from the server computing device and applying the target effect resource to the target object on the photographed picture;

a generation module for generating a target video based on a photographed picture corresponding to the target object to which the target effect resource is applied.

In a fifth aspect, the present disclosure proves a video generation apparatus, wherein the apparatus is applied to a server computing device and comprises:

a first receiving module for receiving a target identification image from a client computing device; wherein the target identification image is obtained based on the photographed picture on the photographing page of the client computing device;

a first determination module for determining whether the target identification image contains any one preset object;

a second determination module for in response to determining that the target identification image contains any one preset object, determining the preset object as target object and determining a target effect resource corresponding to the target object;

a return module for returning the target effect resource to the client computing device; wherein the target effect resource is used for generating a target video at the client computing device.

In a sixth aspect, the present disclosure provides a computer-readable storage medium stored with instructions therein which, when running on a terminal device, cause the terminal device to perform the above method.

In a seventh aspect, the present disclosure provides a device, comprising: a memory, a processor and a computer program stored on the memory and executable on the processor, wherein the processor, when executing the computer program, performs the above method.

In an eighth aspect, the present disclosure provides a program product comprising a computer program/instruction which, when executed, performs the above method.

In comparison to the prior art, the technical solution provided by the embodiments of the present disclosure at least has following advantages:

The video generation method is provided by the embodiments of the present disclosure. First of all, upon receiving an identification operation triggered for a photographed picture on a photographing page, the client computing device obtains a target identification image based on the photographed picture on the photographing page and transmits the target identification image to a server computing device; wherein the server computing device is configured to determine a target effect resource for a target object after identifying the target object from the target identification image. Then, the client computing device receives the target effect resource from the server computing device, applies the target effect resource to the target object on the photographed picture and generates a target video based on the photographed picture corresponding to the target object to which the target effect resource is applied. In the embodiments of the present disclosure, the matching target effect resource can be automatically applied to the target object in the photographed picture to generate a target video during the video shooting. As such, the functions of video shooting are enriched by the embodiments of the present disclosure, so as to enhance the users' experience in video creation.

BRIEF DESCRIPTION OF THE DRAWINGS

The drawings here are incorporated into the description as a part of it, illustrate the embodiments conforming with the present disclosure, and are combined with the description to explain the principles of the present disclosure.

To more clearly explain the technical solution in the embodiments of the present disclosure or in the prior art, the drawings needed in the description of the embodiments or the prior art are to be introduced simply below. Apparently, those skilled in the art may also obtain other drawings from those illustrated without any exercises of inventive work.

DETAILED DESCRIPTION OF EMBODIMENTS

For a clearer understanding of the above objectives, features and advantages of the present disclosure, the solution of the present disclosure is to be further described below. It is to be appreciated that embodiments of the present disclosure and features within the embodiments may be combined with one another without causing conflicts.

Many details are elaborated in the following description to provide a more comprehensive understanding of the present disclosure. However, the present disclosure also may be implemented in different ways than those described here. Apparently, the embodiments disclosed in the description is only a part of the embodiments of the present disclosure, rather than all of them.

To enrich the functions of video shooting and enhance users' experience in video creation, the embodiments of the present disclosure propose a video generation method. First of all, upon receiving an identification operation triggered for a photographed picture on a photographing page, the client computing device obtains a target identification image based on the photographed picture on the photographing page and transmits the target identification image to a server computing device; wherein the server computing device is used for determining a target effect resource for a target object after identifying the target object from the target identification image. Then, the client computing device receives the target effect resource from the server computing device, applies the target effect resource to the target object on the photographed picture and generates a target video based on the photographed picture corresponding to the target object to which the target effect resource is applied. In the embodiments of the present disclosure, the matching target effect resource can be automatically applied to the target object on the photographed picture to generate a target video during the video shooting. As such, the functions of video shooting are enriched by the embodiments of the present disclosure, so as to enhance the users' experience in video creation.

Figure 1:
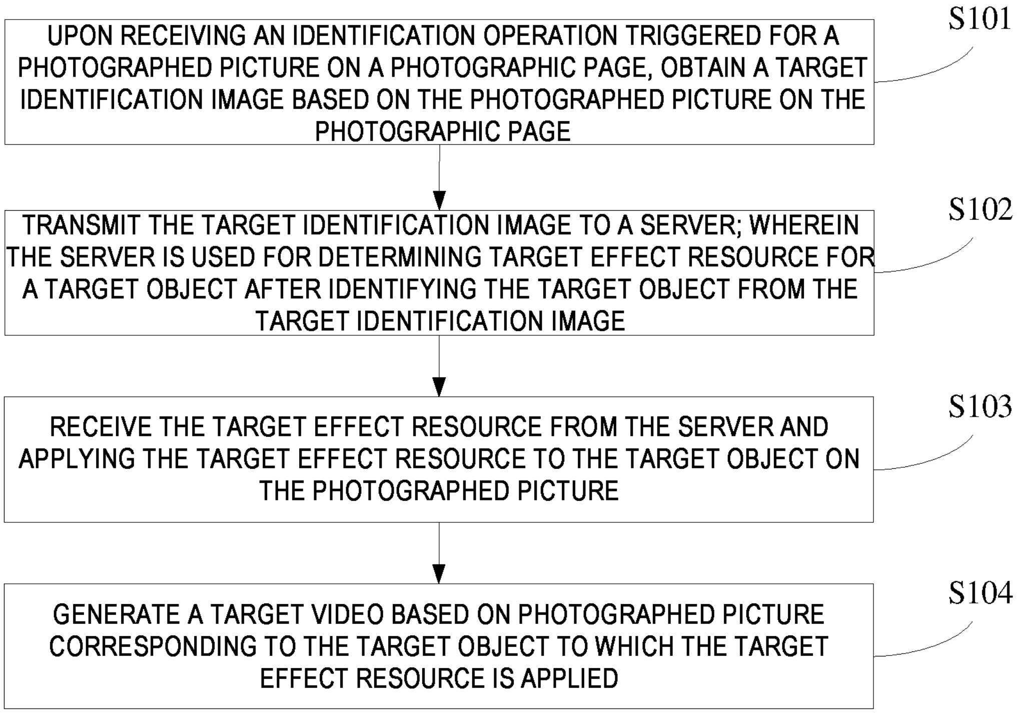
FIG. 1 illustrates a flowchart of a video generation method provided by embodiments of the present disclosure.

On this basis, the embodiments of the present disclosure provide a video generation method. FIG. 1 illustrates a flowchart of a video generation method provided by the embodiments of the present disclosure. As shown in FIG. 1, the method is applied to the client computing device and comprises:

S101: upon receiving an identification operation triggered for a photographed picture on a photographing page, obtaining a target identification image based on the photographed picture on the photographing page.

In the embodiments of the present disclosure, there may be many ways to trigger an identification operation for the photographed picture on the photographing page. For example, one way is to trigger a "long hold" operation for the photographed picture on the photographing page, wherein the long hold operation may be triggered for any position on the photographed picture. A further way is to trigger an operation for identification control configured on the photographing page, wherein the identification control may be disposed at any position on the photographed picture (e.g., right side or underside of the photographing page etc.).

In the embodiments of the present disclosure, upon receiving an identification operation triggered for photographed picture on a photographing page, a target identification image obtained based on the photographed picture on the photographing page may be one frame of image captured by a current camera, or any one frame of image extracted from a plurality of continuous frames of images, wherein the plurality of continuous frames of images include a plurality of continuous frames of images in which an ending frame is the current image corresponding to the photographed picture. For example, when the current camera captures five continuous frames of images in which an ending frame is the current image corresponding to the photographed picture, the second frame of image is extracted as the target identification image.

It is to be explained that a plurality of continuous frames of images in which an ending frame is the current image corresponding to the photographed picture included in the above a plurality of continuous frames of images may be five continuous frames of images or seven continuous frames of images and the like. Besides, the second frame of image or the third frame of image in the above continuous frames of images may be extracted as the target identification image. The embodiments of the present disclosure do not restrict the specific frame number of the plurality of continuous frames of images, nor do define which frame of image should be extracted as the target identification image.

The target identification image obtained in the above embodiments may be vague or in darker color. It is possible that an invalid target identification image may be subsequently sent to the server computing device for identification. Accordingly, it may be first determined, for the target identification image obtained based on the photographed picture on the photographing page, whether its image definition conforms with a preset definition condition, to reduce invalid input situations.

In some implementations, the target identification image that the image definition conforms with a preset definition condition is determined according to the following steps A1-A3.

Step A1: upon receiving an identification operation triggered for a photographed picture on a photographing page, obtaining a current image corresponding to the photographed picture as an image with definition to be identified.

In the embodiments of the present disclosure, a current image corresponding to the photographed picture is obtained upon receiving an identification operation triggered for a photographed picture on a photographing page, where the current image corresponding to the photographed picture may be one frame of image, e.g., image 1; the current image corresponding to the photographed picture may also be any one frame of image extracted from a plurality of continuous frames of images, wherein the current image corresponding to the photographed picture is the ending frame of the plurality of continuous frames of images. Therefore, the obtained current image is used as the image with definition to be identified.

Step A2: determining whether a definition of the image with definition to be identified conforms with a preset definition condition.

In some implementations, determining whether a definition of the image with definition to be identified conforms with a preset definition condition includes: processing the image with definition to be identified based on a preconfigured fuzzy filtering model, to obtain an image definition value of the image with definition to be identified; if an image definition value of the image with definition to be identified is greater than or equal to a value threshold indicating conformity with a preset definition condition, it is determined that the image definition of the image with definition to be identified conforms with the preset definition condition; if the image definition value of the image with definition to be identified is smaller than a value threshold indicating conformity with a preset definition condition, it is determined that the image definition of the image with definition to be identified fails to conform with the preset definition condition.

In the embodiments of the present disclosure, there may be many ways to determine whether a definition of the image with definition to be identified conforms with a preset definition condition. For example, one of them is to compare the image definition of the image with definition to be identified with an image definition pre-stored in the client computing device indicating conformity with a preset definition condition, so as to determine whether the definition of the image with definition to be identified conforms with a preset definition condition. Another way is to configure a fuzzy filtering model in the client computing device in advance, wherein the fuzzy filtering model may be obtained based on image training samples with various definition. The image with definition to be identified is processed by the fuzzy filtering model. Then, an image definition value of the image with definition to be identified may be output. Assuming that a value threshold indicating conformity with a preset definition condition is set to 80, the image conforming with the preset definition condition should have a corresponding image definition value greater than or equal to 80, and so on.

It is to be explained that the above set value threshold indicating conformity with a preset definition condition may be provided for determining whether an image definition of the image conforms with the preset definition condition. The value threshold may be set to 80, 82, 85 and the like as required. The embodiments of the present disclosure do not restrict the specific value of the value threshold indicating conformity with a preset definition condition.

Step A3: if it is determined that an image definition of the image with definition to be identified conforms with a preset definition condition, determining the image with definition to be identified as a target identification image.

In the embodiments of the present disclosure, based on the above step A2, if it is determined that an image definition of the image with definition to be identified (e.g., image 1) conforms with a preset definition condition, the image 1 is identified as a target identification image.

For example, taking the configuration of the fuzzy filtering model in advance in the client computing device in the above step A2 as an example, it is assumed that the value threshold indicating conformity with a preset definition condition is set to 80. Upon receiving an identification operation triggered for the photographed picture on a photographing page, a current image corresponding to the photographed picture (e.g., image 1) is obtained. The image 1 is input to the fuzzy filtering model for processing, and the resulting image definition value of the image 1 (such as 90) is obtained based on the processing. The resulting image definition value is compared with the preset threshold (e.g., 80). According to the comparison, it is determined that the image definition of the image 1 conforms with the preset definition condition (e.g., 90 greater than 80) and the image 1 is determined as the target identification image.

In some implementations, following the step A2 in the above embodiments, if it is determined that an image definition of the image with definition to be identified does not conform with a preset definition condition, an image is obtained from the photographed picture on the photographing page based on preset rule of extracting frame and the image with definition to be identified is updated with the image. Furthermore, a step of determining whether a definition of the image with definition to be identified conforms with a preset definition condition continues to be executed, until it is determined that a preset definition identification termination condition is met.

In some embodiments, obtaining an image from the photographed picture on the photographing page based on preset rule of extracting frame includes: extracting one frame of image from images corresponding to the photographed picture by an interval of a predetermined time; or, extracting one frame of image from images corresponding to the photographed picture by an interval of a predetermined frame number.

In the embodiments of the present disclosure, the preset rule of extracting frame may include extracting one frame of image from images corresponding to the photographed picture by an interval of a predetermined time; or, extracting one frame of image from images corresponding to the photographed picture by an interval of a predetermined frame number. The above interval of a predetermined time may be 20 ms or 30 ms, and the interval of a predetermined frame number may be 20 frames or 30 frames. The embodiments of the present disclosure are not restricted in the specific values for the interval of a predetermined time and the interval of a predetermined frame number.

In some embodiments, determining that a preset definition identification termination condition is met includes: if it is determined that a number of image frames extracted from images corresponding to the photographed picture reaches a preset image extraction number, identification for image definition is terminated; or, if it is determined that an image definition value of the image with definition to be identified is smaller than a preset minimum value, identification for image definition is terminated.

In the embodiments of the present disclosure, the preset definition identification termination condition may include: terminating the image definition identification if the number of image frames extracted reaches a preset image extraction number; alternatively terminating the image definition identification if an image definition value of the image with definition to be identified is smaller than a preset minimum value, wherein the above preset image extraction number may be, 3, 5 or 7. The embodiments of the present disclosure are not limited in the specific value for the preset image extraction number.

For example, in a scenario where the fuzzy filtering model is configured in the client computing device in advance and the value threshold indicating conformity with a preset definition condition is set to 80, it is assumed that the preset image extraction number in the preset definition identification termination condition is 5. If it is determined that an image definition of the image with definition to be identified (e.g., image 1) does not conform with the preset definition condition, one frame of image (such as image 2) is extracted from the images corresponding to the photographed picture by an interval of a predetermined time (e.g., 30 ms). The image with definition to be identified is updated with the image 2, i.e., image 2 is the new image with definition to be identified. The process continues to determine whether the image definition of the image 2 conforms with the preset definition condition. The image 2 is input to the fuzzy filtering model and the resulting image definition value of the image 2 is smaller than the preset threshold (e.g., 80). In such case, it is determined that the image definition of the image 2 also fails to conform with the preset definition condition. It is further determined whether the obtained image 2 meets a preset definition identification termination condition. If not, the process continues to extract an image (e.g., image 3) from the photographed picture on the photographing page based on the preset image extraction conditions, and so on, until an image 5 is obtained from the photographed picture on the photographing page. It is then determined whether the image definition of the image 5 conforms with the preset definition condition. If yes, the image 5 is determined as the target identification image. If not and it is determined that the image 5 has met the preset definition identification termination condition (such as the number of the extracted image frame reaching 5), the image definition identification is terminated and the users are prompted with failure of this identification.

Therefore, in the embodiments of the present disclosure, the client computing device can first determine the target identification image with an image definition conforming with the preset definition condition and then sent it to the server computing device. This can reduce invalid inputs, so as to lower the number of the invalid identification performed at the server computing device while decreasing wastes of network resources between the client computing device and the server computing device.

S102: transmitting the target identification image to a server computing device.

wherein the server computing device is used for determining a target effect resource for a target object after identifying the target object from the target identification image.

In the embodiments of the present disclosure, the target identification image obtained from the above S101 is sent to the server computing device, which server computing device can perform the identification process on the target identification image. If a corresponding target object is identified for the target identification image, a corresponding target effect resource is determined for the target object, wherein the target object may include any classes of objects whose corresponding feature information can be collected, e.g., objects in the classes including pictures, three-dimensional objects and iconic buildings etc., like a give T-shirt pattern, drink can and high-rise building. After the server computing device identifies the target object from the target identification image, the specific implementations for determining the target effect resource for the target object are to be introduced in the following text and will not be repeated here.

S103: receiving the target effect resource from the server computing device and applying the target effect resource to the target object on the photographed picture.

In the embodiments of the present disclosure, according to the above S102, if the server computing device identifies the target object from the target identification image, the target effect resource is determined for the target object and transmitted to the client computing device. The client computing device can receive the target effect resource and apply them to the target object on the photographed picture. Specifically, SDK (Software Development Kit) parses the target effect resource to obtain props and templates contained in the target effect resource. Subsequent to the initialization of the SDK, the effects are rendered on the photographed picture of the client computing device, such that the users can pre-view on a preview picture of the photographing page.

Moreover, since the client computing device can apply the target effect resource to the target object on the photographed picture, the client computing device also may receive the position information of the target object on the photographed picture provided by the server computing device in addition to the target effect resource from the server computing device. This may subsequently facilitate the client computing device to apply the target effect resource to the target object on the photographed picture.

In some implementations, the position information indicating a location of the target object in the photographed picture is received from the server computing device and the target effect resource is further applied to the target object on the photographed picture based on the position information.

In the embodiments of the present disclosure, the client computing device also can receive the position information indicating a location of the target object in the photographed picture from the server computing device in addition to the target effect resource from the server computing device. This accordingly facilitates the client computing device to apply the target effect resource to the target object on the photographed picture based on the position information, wherein the position information indicating a location of the target object in the photographed picture may be characterized by coordinates.

S104: generating a target video based on photographed picture corresponding to the target object to which the target effect resource is applied.

In the embodiments of the present disclosure, the target effect resource may include props, effects and templates recommended based on the corresponding target object. For example, the target effect resource may include at least one of virtual overlay effect, occlusion effect, amplification effect and special effect processing effect. A video recording operation is triggered based on the photographed picture corresponding to the target object to which the target effect resource is applied, so as to generate a target video, wherein the target video may include any one or more effects in the target effect resource corresponding to the target object. Accordingly, the video effects are enriched and the users' experience in creation is also enhanced.

For example, when the target object is a drink can, the client computing device receives the corresponding target effect resource of the drink can determined by the server computing device in accordance with the above embodiments. Assuming that the target effect resource includes the virtual overlay effect, a combined effect of the virtual world information and the target object may appear on the preview picture of the photographing page after the target effect resource is applied to the target object on the photographed picture. Assuming that the target effect resource includes the occlusion effect, an effect where animation resources partly occlude the target object may appear on the preview picture of the photographing page after the target effect resource is applied to the target object on the photographed picture. Assuming that the target effect resource includes the amplification effect, an effect where the target object is fully or partially amplified may appear on the preview picture of the photographing page after the target effect resource is applied to the target object on the photographed picture. Assuming that the target effect resource includes the special effect processing, an effect where texts resources rotate about the target object may appear on the preview picture of the photographing page after the target effect resource is applied to the target object on the photographed picture, and so on.

In the video generation method provided by the embodiments of the present disclosure, first of all, upon receiving an identification operation triggered for a photographed picture on a photographing page, the client computing device obtains a target identification image based on the photographed picture on the photographing page and transmits the target identification image to a server computing device; wherein the server computing device is used for determining a target effect resource for a target object after identifying the target object from the target identification image. Then, the client computing device receives the target effect resource from the server computing device, applies the target effect resource to the target object on the photographed picture and generates a target video based on photographed picture corresponding to the target object to which the target effect resource is applied. In the embodiments of the present disclosure, the matching target effect resource can be automatically applied to the target object on the photographed picture to generate a target video during the video shooting. As such, the functions of video shooting are enriched by the embodiments of the present disclosure, so as to enhance the users' experience in video creation.

Figure 2:
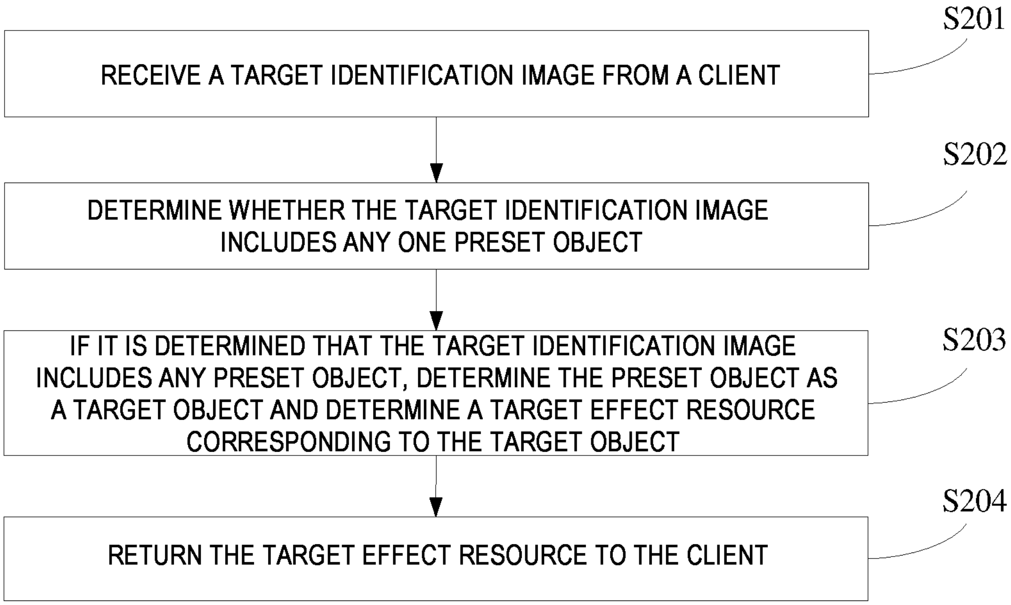
FIG. 2 illustrates a flowchart of a further video generation method provided by embodiments of the present disclosure.

Based on the above video generation system, the embodiments of the present disclosure provide a further video generation method. FIG. 2 illustrates a flowchart of a further video generation method provided by the embodiments of the present disclosure. As shown in FIG. 2, the method is applied to the server computing device and comprises:

S201: receiving a target identification image from a client computing device.

Wherein the target identification image is obtained from the photographed picture on the photographing page of the client computing device.

In the embodiments of the present disclosure, the client computing device receives the target identification image from the client computing device, wherein the target identification image is one frame of image obtained by the client computing device based on the photographed picture on the photographing page upon receiving an identification operation triggered for the photographed picture on a photographing page. In some embodiments, the target identification image whose image definition is determined to conform with the preset definition condition at the client computing device may serve as the target identification image received by the server computing device.

S202: determining whether the target identification image contains any one preset object.

In the embodiments of the present disclosure, the preset object may include any classes of objects whose corresponding feature information can be collected, e.g., objects in the class including pictures, three-dimensional objects and iconic buildings etc., like a give T-shirt pattern, drink can and high-rise building. On the basis of the target identification image obtained from the above S201, it is determined whether the target identification image contains any one preset object. For example, if the photographed picture on the photographing page is a table with one drink can placed thereon, the preset object contained in the target identification image may be the drink can; if the photographed picture on the photographing page is a plurality of high buildings, the preset object contained in the target identification image may be high-rise buildings, and so on.

In some implementations, in order to determine whether the target identification image contains any one preset object, image features of the target identification image are first extracted, then the image features match with feature information corresponding to the preset objects.

In the embodiments of the present disclosure, a corresponding relation between the preset object and its feature information is pre-configured at the server computing device. After receiving the target identification image from the client computing device, the feature information of the target identification image is extracted and further matches with the preset feature information corresponding to the preset object.

For example, an information comparison model is configured at the server computing device, wherein the information comparison model may be obtained from training on the basis of a sample set of corresponding relations between the different preset objects and feature information corresponding to preset objects. The server computing device enters the extracted feature information of the target identification image into the information comparison model to obtain a match result corresponding to the feature information of the target identification image.

In the embodiments of the present disclosure, in view of the match result in the above embodiments, if image features of the target identification image match feature information corresponding to any one preset object, the preset object is determined as target object.

For example, in a scenario where the information comparison model is configured at the server computing device the sample data of the information comparison model includes a corresponding relation between the drink can and its feature information (e.g., data X (length, width and height) of the drink can), and the extracted feature information of the target identification image includes the data X of length, width and height. By inputting the feature information of the target identification image into the information comparison model, a result indicating a successful match between the feature information (e.g., length, width and height data X) and the feature information corresponding to the preset object (e.g., drink can) may be obtained. Accordingly, the preset object (e.g., drink can) is determined as the target object and the target object identified from the target identification image is the drink can.

S203: If it is determined that the target identification image contains any one preset object, determining the preset object as target object and determining a target effect resource corresponding to the target object.

In the embodiments of the present disclosure, it is determined in the above S202 whether the target identification image contains any one preset object. If it is determined that the target identification image contains any one preset object, the preset object is determined as target object and a target effect resource corresponding to the target object is also decided, wherein the target effect resource may include props, effects and templates recommended based on the corresponding target object.

In the embodiments of the present disclosure, if it is determined that the target identification image does not include any one preset object, it indicates failure of identification and the server computing device may determine common effect resources for the client computing device.

S204: returning the target effect resource to the client computing device.

Wherein the target effect resource is used for generating a target video at the client computing device.

In some embodiments, after determining the preset object as target object, the method also comprises: returning position information indicating a location of the target object in the photographed picture to the client computing device, such that the client computing device applies the target effect resource to the target object on the photographed picture based on the position information.

In the embodiments of the present disclosure, the target effect resource corresponding to the target object is determined from the above S203. The server computing device returns the target effect resource to the client computing device and also may return to the client computing device position information indicating a location of the target object in the photographed picture, to facilitate the client computing device to generate a target video based on the target effect resource and the position information indicating a location of the target object in the photographed picture.

In the video generation method provided by the embodiments of the present disclosure, first of all, the server computing device receives a target identification image from a client computing device; wherein the target identification image is obtained based on the photographed picture on the photographing page of the client computing device. Then, the server computing device determines whether the target identification image contains any one preset object. If it is determined that the target identification image contains any one preset object, the preset object is determined as target object and a target effect resource corresponding to the target object is also decided. Further, the target effect resource is returned to the client computing device, wherein the target effect resource is used for generating a target video at the client computing device. In the embodiments of the present disclosure, the matching target effect resource can be automatically applied to the target object on the photographed picture to generate a target video during the video shooting. As such, the functions of video shooting are enriched by the embodiments of the present disclosure, so as to enhance the users' experience in video creation.

Figure 3:
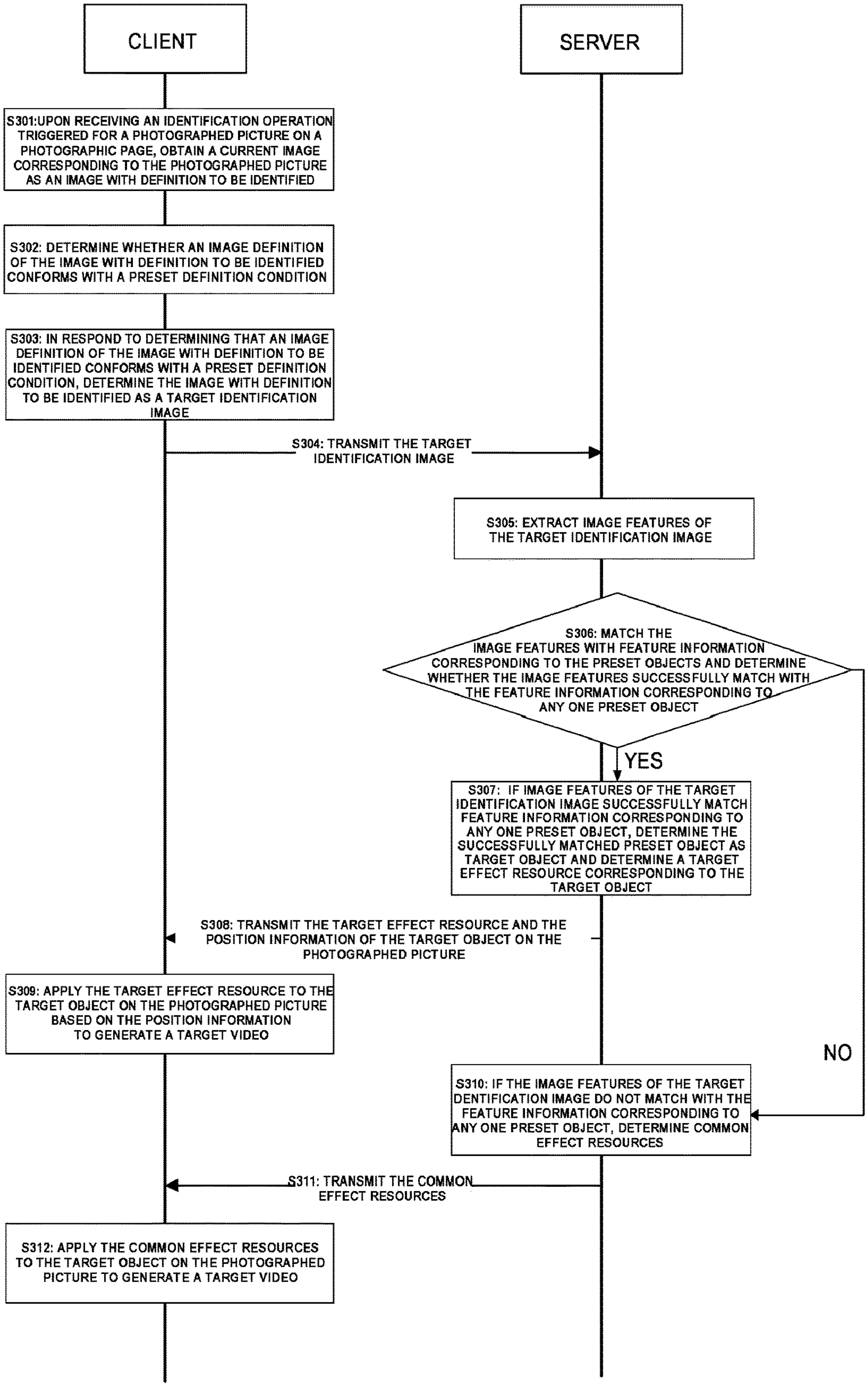
FIG. 3 illustrates a schematic diagram of data interaction of a video generation method provided by the embodiments of the present disclosure.

In accordance with the above video generation method, the embodiments of the present disclosure also provide a video generation method. FIG. 3 illustrates a schematic diagram of data interaction of the video generation method provided by the embodiments of the present disclosure. As shown in FIG. 3, the method comprises:

S301: the client computing device, upon receiving an identification operation triggered for a photographed picture on a photographing page, obtains a current image corresponding to the photographed picture as an image with definition to be identified.

In the embodiments of the present disclosure, upon receiving an identification operation triggered for the photographed picture on a photographing page, the client computing device obtains one frame of current image corresponding to the photographed picture, e.g., image 1, as an image with definition to be identified.

S302: the client computing device determines whether an image definition of the image with definition to be identified conforms with a preset definition condition.

In the embodiments of the present disclosure, the image 1 is input to the fuzzy filtering model preset in the client computing device, wherein it is assumed that a value threshold indicating conformity with a preset definition condition corresponding to the fuzzy filtering model is set to 80. The value (such as 90) of the image 1 is output based on the processing of the fuzzy filtering model.

S303: in response to determining that an image definition of the image with definition to be identified conforms with a preset definition condition, the image with definition to be identified is determined as a target identification image.

In the embodiments of the present disclosure, the value of the image 1 output from the above S302 is compared with the preset threshold (e.g., 80). If it is determined that an image definition of the image 1 has conforms with a preset definition condition (e.g., 90 greater than the threshold of 80), the image 1 is determined as a target identification image.

S304: the client computing device transmits the target identification image to a server computing device.

In the embodiments of the present disclosure, the client computing device transmits the target identification image determined (i.e., image 1) in the above S303 to the server computing device.

S305: the client computing device extracts image features of the target identification image.

In the embodiments of the present disclosure, an information comparison model is pre-configured in the server computing device and the target identification image (such as image 1) is input to the information comparison model to extract image features of the image 1.

S306: the server computing device matches the image features with feature information corresponding to preset objects and determines whether the image features match with the feature information corresponding to any one preset object. If yes, S307 is performed; if not, S310 is executed.

In the embodiments of the present disclosure, the information comparison model in the server computing device may be obtained from training based on a sample set of corresponding relations between the different preset objects and their corresponding feature information. The image 1 is input to the information comparison model, and the image features of the image 1 are matched with the feature information corresponding to the preset object to produce a corresponding match result for the feature information of the image 1.

S307: if image features of the target identification image match feature information corresponding to any one preset object successfully, the successfully matched preset object is determined as target object and the corresponding target effect resource of the target object is decided.

In the embodiments of the present disclosure, based on the match result in the above S306, if image features (e.g., length, width and height data X) of the image 1 match feature information (such as length, width and height data Y of the drink can) corresponding to any one preset object successfully, the preset object (e.g., drink can) is determined as target object and the corresponding target effect resource of the target object is decided, wherein the target effect resource may include props, effects and templates recommended on the basis of the corresponding target object. For example, the target effect resource may include at least one of virtual overlay effect, occlusion effect, amplification effect and special effect processing effect.

S308: the server computing device transmits to the client computing device the target effect resource and the position information indicating a location of the target object in the photographed picture.

In the embodiments of the present disclosure, if the client computing device determines the preset object as the target object, the target effect resource corresponding to the target object and the position information indicating a location of the target object in the photographed picture can be determined. The server computing device transmits to the client computing device the target effect resource and the position information indicating a location of the target object in the photographed picture, to facilitate the client computing device to subsequently apply the target effect resource to the target object on the photographed picture based on the position information.

S309: the client computing device applies the target effect resource to the target object on the photographed picture based on the position information to generate a target video.

In the embodiments of the present disclosure, after receiving the target effect resource and the position information indicating a location of the target object in the photographed picture, the client computing device parses the target effect resource to obtain configuration, such as props and templates et al., contained in the target effect resource. Subsequent to the initialization of the SDK, the effects are rendered on the photographed picture of the client computing device, such that the users can pre-view on a preview picture of the photographing page.

In the embodiments of the present disclosure, when the server computing device receives an operation that triggers the recording, the recording is performed based on the preview picture to which the target effect resource is applied, so as to generate a target video.

S310: if the image features of the target identification image do not match with the feature information corresponding to any one preset object, the server computing device determines common effect resources for the client computing device.

In the embodiments of the present disclosure, according to the match result in the above S306, if the image features (e.g., length, width and height data X) of the image 1 do not match with the feature information corresponding to any one preset object, it indicates failure of identification for the target object and the server computing device may determine common effect resources for the client computing device.

S311: the server computing device transmits to the client computing device the common effect resources.

S312: the client computing device applies the common effect resources to the target object on the photographed picture to generate a target video.

In the embodiments of the present disclosure, after receiving the common effect resources, the client computing device parses the common effect resources to obtain configurations, such as props and templates, contained in the common effect resources. Subsequent to the initialization of the SDK, the effects are rendered on the photographed picture of the client computing device, such that the users can pre-view on a preview picture of the photographing page. When the server computing device receives an operation that triggers the recording, the recording is performed based on the preview picture to which the common effect resources are applied, so as to generate a target video.

In the embodiments of the present disclosure, the server computing device can determine target effect resource based on the target object identified on the photographed picture, such that the client computing device can apply the target effect resource determined by the server computing device to the object image on the photographed picture, to generate a video. As such, the functions of video shooting are enriched, thereby enhancing the users' experience in video creation.

Figure 4:
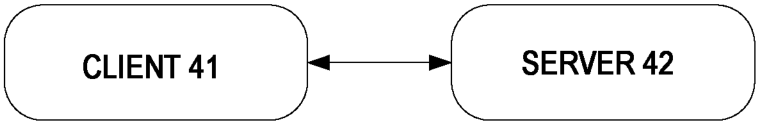
FIG. 4 illustrates a structural diagram of a video generation system provided by the embodiments of the present disclosure.

In accordance with the above video generation method, the embodiments of the present disclosure propose a video generation system. FIG. 4 is a structural diagram of a video generation system provided by the embodiments of the present disclosure. As shown in FIG. 4, the video generation system may include a client computing device 41 and a server computing device 42. The client computing device 41 is communicatively linked to the server computing device 42.

The client computing device 41 is used for obtaining a target identification image based on a photographed picture on the photographing page upon receiving an identification operation triggered for the photographed picture on a photographing page, and transmitting the target identification image to the server computing device 42.

The server computing device 42 is used for receiving a target identification image from the client computing device 41 and determining whether the target identification image contains any one preset object; determining the preset object as target objects and determining target effect resource corresponding to the target object if it is determined that the target identification image contains any one preset object; and returning the target effect resource to the client computing device 41.

The client computing device 41 is also used for receiving the target effect resource from the server computing device 42 and applying the target effect resource to the target object on the photographed picture; and generating a target video on based on the photographed picture corresponding to the target object to which the target effect resource is applied.

In some implementations, the client computing device 41 also obtains a current image corresponding to the photographed picture as an image with definition to be identified upon receiving an identification operation triggered for the photographed picture on a photographing page; determines whether an image definition of the image with definition to be identified conforms with a preset definition condition; and if it is determined that an image definition of the image with definition to be identified conforms with a preset definition condition, the image with definition to be identified is determined as a target identification image.

In some implementations, the client computing device 41 also obtains an image from the photographed picture on the photographing page based on preset rule of extracting frame if it is determined that the image definition of the image with definition to be identified does not conform with a preset definition condition, and updates the image with definition to be identified with the image; and continues to execute a step of the determining whether a definition of the image with definition to be identified conforms with a preset definition condition, until it is determined that a preset definition identification termination condition is met.

In some implementations, the client computing device 41 further processes the image with definition to be identified based on a preconfigured fuzzy filtering model, to obtain an image definition value of the image with definition to be identified; if an image definition value of the image with definition to be identified is greater than or equal to a value threshold indicating conformity with a preset definition condition, it is determined that image definition of the image with definition to be identified conforms with the preset definition condition; and if the image definition value of the image with definition to be identified is smaller than a value threshold indicating conformity with a preset definition condition, it is determined that image definition of the image with definition to be identified fails to conform with the preset definition condition.

In some implementations, the client computing device 41 also extracts one frame of image from images corresponding to the photographed picture by an interval of a predetermined time; or, extracts one frame of image from images corresponding to the photographed picture by an interval of a predetermined frame number.

In some implementations, the client computing device 41 also terminates identification for image definition if it is determined that a number of image frames extracted from images corresponding to the photographed picture reaches a preset image extraction number; or, terminates identification for image definition if it is determined that the image definition value of the image with definition to be identified is smaller than a preset minimum value.

In some implementations, the client computing device 41 also receives from the server computing device 42 position information indicating a location of the target object in the photographed picture; and apples the target effect resource to the target object on the photographed picture based on the position information.

In some implementations, the server computing device 42 also extracts image features of the target identification image; and matches the image features with feature information corresponding to preset objects; if image features of the target identification image successfully match feature information corresponding to any one preset object, the server computing device determines the preset object as target object.

In some implementations, the server computing device 42 also returns position information indicating a location of the target object in the photographed picture to the client computing device, such that the client computing device 41 applies the target effect resource to the target object on the photographed picture based on the position information.

In the video generation system provided by the embodiments of the present disclosure, the server computing device 42 can determine a target effect resource based on the target object identified on the photographed picture, such that the client computing device 41 can apply the target effect resource determined by the server computing device 42 to the object image on the photographed picture, to generate a video. As such, the functions of video shooting are enriched, thereby enhancing the users' experience in video creation.

Figure 5:
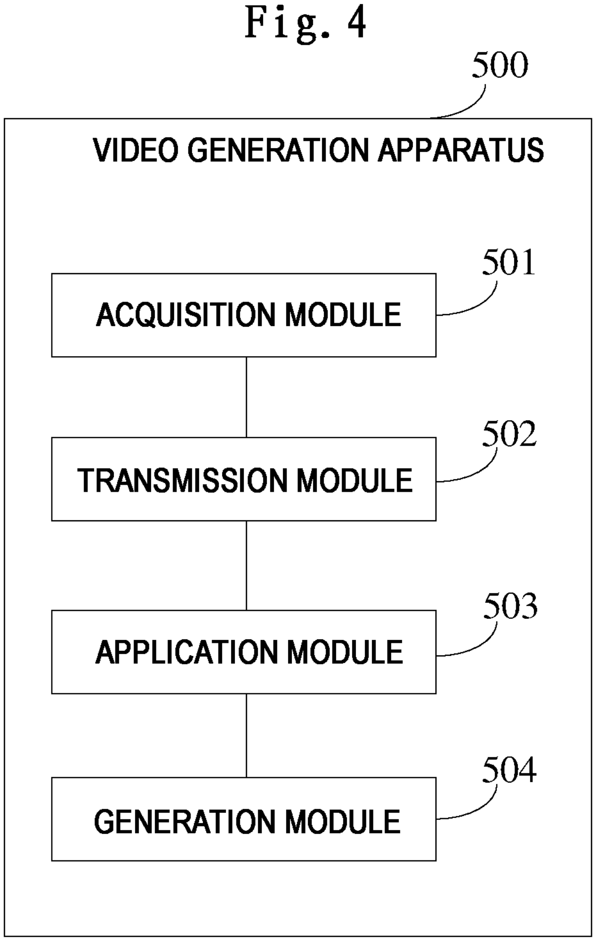
FIG. 5 illustrates a structural diagram of a video generation apparatus provided by the embodiments of the present disclosure.

In accordance with the above method embodiments, the present disclosure also proposes a video generation apparatus. FIG. 5 is a structural diagram of a video generation apparatus provided by the embodiments of the present disclosure. The apparatus is applied to the client computing device and the video generation apparatus 500 includes:

an acquisition module 501 for upon receiving an identification operation triggered for a photographed picture on a photographing page, obtaining a target identification image based on the photographed picture on the photographing page;

a transmission module 502 for transmitting the target identification image to a server computing device; wherein the server computing device is used for determining a target effect resource for a target object after identifying the target object from the target identification image;

an application module 503 for receiving the target effect resource from the server computing device and applying the target effect resource to the target object on the photographed picture;

a generation module 504 for generating a target video based on the photographed picture corresponding to the target object to which the target effect resource is applied.

In some implementations, the acquisition module 501 includes:

an acquisition sub-module for obtaining a current image corresponding to the photographed picture as an image with definition to be identified upon receiving an identification operation triggered for the photographed picture on a photographing page;

a first determination sub-module for determining whether an image definition of the image with definition to be identified conforms with a preset definition condition;

a second determination sub-module for determining the image with definition to be identified as a target identification image if it is determined that an image definition of the image with definition to be identified conforms with a preset definition condition.

In some implementations, the apparatus also includes:

an updating module for obtaining an image from the photographed picture on the photographing page based on preset rule of extracting frame if it is determined that an image definition the image with definition to be identified does not conform with a preset definition condition, and updating the image with definition to be identified with the image.

an identification module for continuing to execute a step of the determining whether an image definition of the image with definition to be identified conforms with a preset definition condition, until it is determined that a preset definition identification termination condition is met.

In some implementations, the first determination sub-module is specifically used for:

processing the image with definition to be identified based on a preconfigured fuzzy filtering model, to obtain an image definition value of the image with definition to be identified; if an image definition value of the image with definition to be identified is greater than or equal to a value threshold indicating conformity with a preset definition condition, determining that image definition of the image with definition to be identified conforms with the preset definition condition; and if the image definition value of the image with definition to be identified is smaller than a value threshold indicating conformity with a preset definition condition, determining that image definition of the image with definition to be identified fails to conform with the preset definition condition.

In some implementations, the updating module is used specifically for:

extracting one frame of image from images corresponding to the photographed picture by an interval of a predetermined time; or, extracting one frame of image from images corresponding to the photographed picture by an interval of a predetermined frame number.

In some implementations, the identification module is used for:

if it is determined that a number of image frames extracted from images corresponding to the photographed picture reaches a preset image extraction number, terminating identification for image definition; or, if it is determined that an image definition value of the image with definition to be identified is smaller than a preset minimum value, terminating identification for image definition.

In some implementations, the apparatus also comprises:

a second receiving module for receiving position information indicating a location of the target object in the photographed picture from the server computing device;

correspondingly, the application module 503 includes:

an application sub-module for applying the target effect resource to the target object on the photographed picture based on the position information.

In the video generation apparatus provided by the embodiments of the present disclosure, first of all, upon receiving an identification operation triggered for a photographed picture on a photographing page, the client computing device obtains a target identification image based on the photographed picture on the photographing page and transmits the target identification image to a server computing device; wherein the server computing device is used for determining a target effect resource for a target object after identifying the target object from the target identification image. Then, the client computing device receives the target effect resource from the server computing device, applies the target effect resource to the target object on the photographed picture and generates a target video based on the photographed picture corresponding to the target object to which the target effect resource is applied. In the embodiments of the present disclosure, the matching target effect resource can be automatically applied to the target object on the photographed picture to generate a target video during the video shooting. As such, the functions of video shooting are enriched by the embodiments of the present disclosure, so as to enhance the users' experience in video creation.

Figure 6:
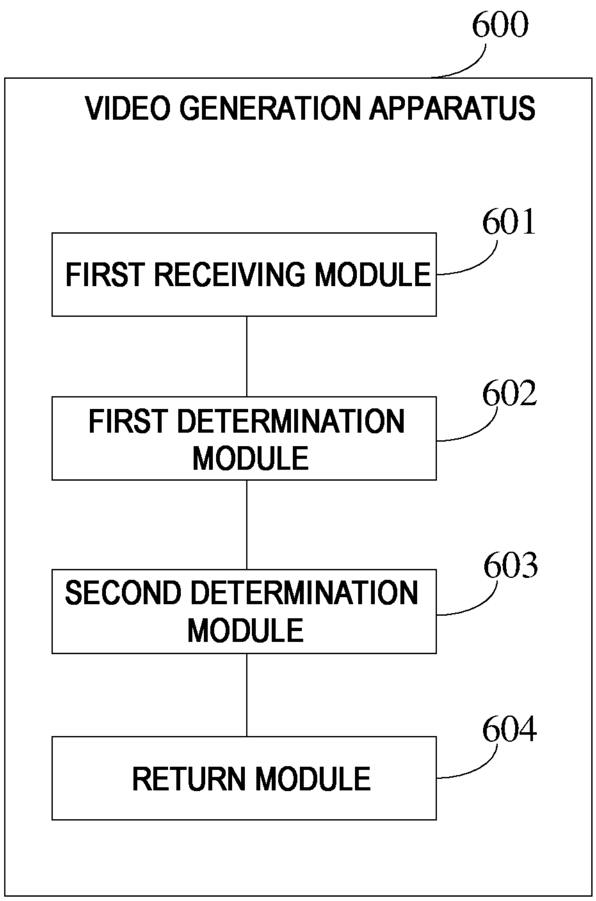
FIG. 6 illustrates a structural diagram of a further video generation apparatus provide by the embodiments of the present disclosure.

Based on the above method embodiments, the present disclosure also provides a video generation apparatus. FIG. 6 illustrates a structural diagram of a further video generation apparatus provided by the embodiments of the present disclosure. The apparatus is applied to the server computing device and the video generation apparatus 600 comprises:

a first receiving module 601 for receiving a target identification image from a client computing device; wherein the target identification image is obtained based on the photographed picture on the photographing page of the client computing device;

a first determination module 602 for determining whether the target identification image contains any one preset object;

a second determination module 603 for determining the preset object as target object if it is determined that the target identification image contains any one preset object, and determining target effect resource corresponding to the target object;

a return module 604 for returning the target effect resource to the client computing device; wherein the target effect resource is used for generating a target video at the client computing device.

In some implementations, the first determination module 602 includes:

an extraction sub-module for extracting image features of the target identification image;

a matching sub-module for matching the image features with feature information corresponding to preset objects;

correspondingly, the second determination module 603 includes:

a third determination sub-module for determining the preset object as target object if image features of the target identification image successfully match feature information corresponding to any one preset object.

In some implementations, the return module 604 is also used for:

returning position information indicating a location of the target object in the photographed picture to the client computing device, such that the client computing device applies the target effect resource to the target object on the photographed picture based on the position information.

In the video generation apparatus provided by the embodiments of the present disclosure, first of all, the server computing device receives a target identification image from a client computing device; wherein the target identification image is obtained based on the photographed picture on the photographing page of the client computing device. Then, the server computing device determines whether the target identification image contains any one preset object. If it is determined that the target identification image contains any one preset object, the preset object is determined as target object and a target effect resource corresponding to the target object is also decided. Further, the target effect resource is returned to the client computing device, wherein the target effect resource is used for generating a target video at the client computing device. In the embodiments of the present disclosure, the matching target effect resource can be automatically applied to the target object on the photographed picture to generate a target video during the video shooting. As such, the functions of video shooting are enriched by the embodiments of the present disclosure, so as to enhance the users' experience in video creation.

In addition to the above method and apparatus, the embodiments of the present disclosure also provide a computer-readable storage medium stored thereon with instructions which, when running on a terminal device, cause the terminal device to implement the video generation method according to the embodiments of the present disclosure.

Embodiments of the present disclosure also provide a computer program product comprising a computer program/instruction which, when executed by a processor, implements the video generation method according to the embodiments of the present disclosure.

Figure 7:
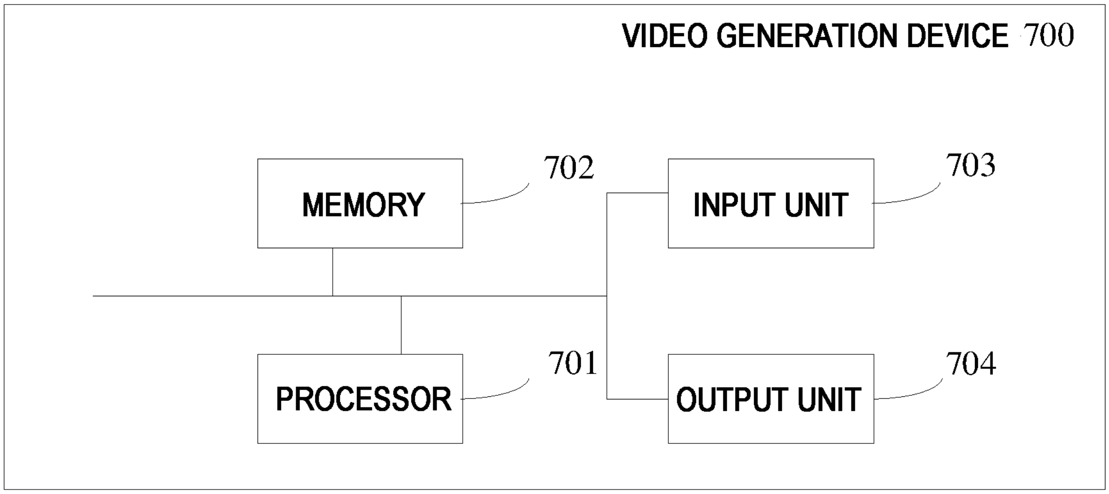
FIG. 7 illustrates a structural diagram of a video generation device provided by the embodiments of the present disclosure.

Moreover, embodiments of the present disclosure also provide a video generation device 700. According to FIG. 7, the device may comprise:

a processor 701, a memory 702, an input unit 703 and an output unit 704. The video generation device may include one or more processors 701 and FIG. 7 only shows one processor as the example. In some embodiments of the present disclosure, the processor 701, the memory 702, the input unit 703 and the output unit 704 may be connected by buses or other components. FIG. 7 illustrates the bus connection as an example.

The memory 702 may be used for storing software programs and modules and the processor 701 operates the software programs and modules stored in the memory 702 to execute the various functional applications and data processing of the video generation device. The memory 702 mainly includes program storage area and data storage area, wherein the program storage area may store operating systems and applications desired by at least one function and the like. Besides, the memory 702 may include a high random access memory and also a non-volatile memory, such as at least one magnetic disk storage device, flash device or other volatile solid-state storage devices. The input unit 703 may be provided for receiving input digital or character information and generating signal inputs associated with the user setting and the functional control of the video generation device.

Specifically, in the embodiments, the processor 701 would load into the memory 702 executable files corresponding to the process of one or more applications in accordance with the following instructions. The processor 701 also operates the applications stored in the memory 702 to implement the above various functions of the video generation device.

It is to be explained that relational terms such as "first" and "second" in the text are disclosed only to distinguish one entity or operation from a further entity or operation without requiring or suggesting any actual relations or sequences between these entities or operations. Besides, the terms "comprise", "contain" or any other variants are not featured with exclusiveness. Accordingly, the procedure, method, object or device including a series of factors may also include other factors not clearly listed in addition to those stated. Alternatively, inherent factors of the procedure, method, object or device are also included. The procedure, method or device including factors defined by the expression of "comprising one . . . " may also contain other same factors if no more restrictions are provided. The above is just the specific implementations of the present disclosure, which are provided for those skilled in the art to understand or implement the present disclosure. Many modifications to the embodiments are obvious for those skilled in the art. General principles defined in the text may be implemented in other embodiments without deviating from the spirit or scope of the present disclosure. Therefore, the present disclosure will not be restricted to the embodiments disclosed herein and instead has a broadest scope consistent with the principles and novel features disclosed here.

What is claimed is:

1. A method of generating videos, wherein the method is applied to a client computing device and comprises:

obtaining, by the client computing device, a target image based on a photographed picture on a photographing page in response to determining that an image definition of the target image conforms with a preset definition condition;

transmitting the target image to a server computing device for the server computing device identifying a target object in the target image that was obtained by and transmitted from the client computing device;

receiving a target effect resource from the server computing device, wherein the target effect resource is determined based on identifying the target object in the target image;

applying the target effect resource to the target object during a video shooting process by the client computing device; and generating a video based on the target object to which the target effect resource is applied during the video shooting process.

2. The method of claim 1, wherein the obtaining, by the client computing device, a target image based on a photographed picture further comprises:

obtaining a current image corresponding to the photographed picture as an image with a definition to be determined; and detecting whether the definition of the image conforms with the preset definition condition; and identifying the image as the target image in response to detecting that the definition of the image conforms with the preset definition condition.

3. The method of claim 2, further comprising:

in response to detecting that the definition of the image fails to conform with the preset definition condition, obtaining another image from photographed pictures on the photographing page based on a preset rule of extracting frame and replacing the image with the other image; and continuing to execute an operation of detecting whether a definition of the other image conforms with the preset definition condition until it is detected that a preset termination condition is met.

4. The method of claim 2, wherein the detecting whether the definition of the image conforms with a preset definition condition further comprises:

processing the image by a model preconfigured to filter fuzzy images and obtaining an image definition value of the image;

identifying that the definition of the image conforms with the preset definition condition in response to detecting that the image definition value of the image is greater than or equal to a value threshold corresponding to the preset definition condition; and identifying that the definition of the image fails to conform with the preset definition condition in response to detecting that the image definition value of the image is less than the value threshold corresponding to the preset definition condition.

5. The method of claim 3, wherein the obtaining another image from photographed pictures on the photographing page based on a preset rule of extracting frame further comprises:

extracting one frame of image from images corresponding to the photographed pictures at intervals of every predetermined time period; or extracting one frame of image from images corresponding to the photographed pictures at intervals of every predetermined number of frames.

6. The method of claim 3, wherein detecting that a preset termination condition is met further comprises:

in response to detecting that a number of frames extracted from the images corresponding to the photographed pictures reaches a preset image extraction number, terminating a process of obtaining another image and determining image definition; or in response to detecting that an image definition value of the image is less than a preset minimum value, terminating the process of obtaining another image and determining image definition.

7. The method of claim 1, further comprising:

receiving position information indicating a location of the target object in the photographed picture from the server computing device; and applying the target effect resource to the target object in the photographed picture based on the position information during the video shooting process.

8. A method of generating videos, wherein the method is applied to a server computing device and comprises:

receiving a target image from a client computing device, wherein an image definition of the target image conforms with a preset definition condition;

detecting whether the target image contains any one preset object;

identifying the any one preset object as a target object in response to detecting that the target image contains the any one preset object;

identifying a target effect resource corresponding to the target object; and transmitting the target effect resource to the client computing device for generating a video by applying the target effect resource to the target object during a video shooting process of the client computing device.

9. The method of claim 8, further comprising:

extracting image features of the target image;

comparing the image features with feature information corresponding to preset objects; and in response to detecting that the image features of the target image match feature information corresponding to the any one preset object, identifying the any one preset object as the target object.

10. The method of claim 8, further comprising:

transmitting position information indicating a location of the target object in the photographed picture to the client computing device such that the client computing device applies the target effect resource to the target object in the photographed picture based on the position information during the video shooting process.

11. A client computing device comprising: a memory, a processor, computer programs stored on the memory and executable by the processor, wherein the computer programs, upon execution by the processor, cause the processor to perform operations comprising:

obtaining, by the client computing device, a target image based on a photographed picture from a photographing page in response to determining that an image definition of the target image conforms with a preset definition condition;

transmitting the target image to a server computing device for the server computing device identifying a target object in the target image that was acquired by and transmitted from the client computing device;

receiving the target effect resource from the server computing device, wherein the target effect resource is determined based on identifying the target object in the target image;

applying the target effect resource to the target object during a video shooting process by the client computing device; and generating a video based on the target object to which the target effect resource is applied during the video shooting process.

12. The client computing device of claim 11, wherein the acquiring, by the client computing device, a target image based on a photographed picture from a photographing page further comprises:

obtaining a current image corresponding to the photographed picture as an image with a definition to be determined; and detecting whether the definition of the image conforms with the preset definition condition; and identifying the image as the target image in response to detecting that the definition of the image conforms with the preset definition condition.

13. The client computing device of claim 12, the operations further comprising:

in response to detecting that the definition of the image fails to conform with the preset definition condition, acquiring another image from photographed pictures on the photographing page based on a preset rule of extracting frame and replacing the image with the other image; and continuing to execute an operation of detecting whether a definition of the other image conforms with the preset definition condition until it is detected that a preset termination condition is met.

14. The client computing device of claim 12, wherein the detecting whether the definition of the image conforms with a preset definition condition-further comprises:

processing the image by a model preconfigured to filter fuzzy images and obtaining an image definition value of the image;

identifying that the definition of the image conforms with the preset definition condition in response to detecting that the image definition value of the image is greater than or equal to a value threshold corresponding to the preset definition condition; and identifying that the definition of the image fails to conform with the preset definition condition in response to detecting that the image definition value of the image is less than the value threshold corresponding to the preset definition condition.

15. The client computing device of claim 13, wherein the acquiring another image from photographed pictures on the photographing page based on a preset rule of extracting frame further comprises:

extracting one frame of image from images corresponding to the photographed pictures at intervals of every predetermined time period; or extracting one frame of image from images corresponding to the photographed pictures at intervals of every predetermined number of frames.

16. The client computing device of claim 13, wherein detecting that a preset termination condition is met further comprises:

in response to detecting that a number of frames extracted from the images corresponding to the photographed pictures reaches a preset image extraction number, terminating a process of obtaining another image and determining image definition; or in response to detecting that an image definition value of the image is less than a preset minimum value, terminating the process of obtaining another image and determining image definition.

17. The client computing device of claim 11, the operations further comprising:

receiving position information indicating a location of the target object in the photographed picture from the server computing device; and applying the target effect resource to the target object in the photographed picture based on the position information during the video shooting process.

18. A server computing device, comprising:

at least one memory, at least one processor, and computer programs stored on the at least one memory and executable by the at least one processor, wherein the computer programs, upon execution by the at least one processor, cause the at least one processor to perform operations comprising:

receiving a target image from a client computing device, wherein an image definition of the target image conforms with a preset definition condition;

detecting whether the target image contains any one preset object;

identifying the any one preset object as a target object in response to detecting that the target image contains the any one preset object;

identifying a target effect resource corresponding to the target object; and transmitting the target effect resource to the client computing device for generating a video by applying the target effect resource to the target object during a video shooting process of the client computing device.

19. The server computing device of claim 18, the operations further comprising:

extracting image features of the target image;

comparing the image features with feature information corresponding to preset objects; and in response to detecting that the image features of the target image match feature information corresponding to the any one preset object, identifying the any one preset object as the target object.

20. The server computing device of claim 18, the operations further comprising:

transmitting position information indicating a location of the target object in the photographed picture to the client computing device such that the client computing device applies the target effect resource to the target object in the photographed picture based on the position information during the video shooting process.

* * * * *